US010760668B2

(12) United States Patent
Matsunaga et al.

(10) Patent No.: US 10,760,668 B2
(45) Date of Patent: Sep. 1, 2020

(54) TRANSMISSION ASSEMBLY STRUCTURE

(71) Applicant: ISUZU MOTORS LIMITED, Shinagawa-ku, Tokyo (JP)

(72) Inventors: Tsutomu Matsunaga, Ayase (JP); Naoki Mizukami, Atsugi (JP); Daisuke Sueoka, Fuchu (JP); Isao Kitsukawa, Fujisawa (JP)

(73) Assignee: ISUZU MOTORS LIMITED, Shinagawa-Ku, Tokyo (JP)

( * ) Notice: Subject to any disclaimer, the term of this patent is extended or adjusted under 35 U.S.C. 154(b) by 0 days.

(21) Appl. No.: 15/775,145

(22) PCT Filed: Nov. 11, 2016

(86) PCT No.: PCT/JP2016/083597
§ 371 (c)(1),
(2) Date: May 10, 2018

(87) PCT Pub. No.: WO2017/082419
PCT Pub. Date: May 18, 2017

(65) Prior Publication Data
US 2018/0347683 A1 Dec. 6, 2018

(30) Foreign Application Priority Data
Nov. 12, 2015 (JP) ................. 2015-222132

(51) Int. Cl.
*F16H 57/025* (2012.01)
*B60K 25/02* (2006.01)
(Continued)

(52) U.S. Cl.
CPC .......... *F16H 57/025* (2013.01); *B60K 25/00* (2013.01); *B60K 25/02* (2013.01); *H02K 5/00* (2013.01);
(Continued)

(58) Field of Classification Search
CPC .... F16H 57/025; F16H 57/023; F16H 57/022; F16H 2057/02021; F16H 2057/02026;
(Continued)

(56) References Cited

U.S. PATENT DOCUMENTS 4,153,034 A    5/1979  Sato et al.
4,687,411 A *  8/1987  Maeda ............... F16C 35/02
                                              384/538

(Continued)

FOREIGN PATENT DOCUMENTS

CN    204657866 U    9/2015
EP    1038719 A1     9/2000
(Continued)

OTHER PUBLICATIONS

JPO Translation of the Description of JP 2007024130 A, Mizuta, Feb. 1, 2007 (Year: 2019).*
(Continued)

*Primary Examiner* — Daniel D Yabut
(74) *Attorney, Agent, or Firm* — Procopio, Cory, Hargreaves & Savitch LLP

(57) ABSTRACT

A transmission assembly structure includes an engine-side joining surface, a transmission-side joining surface, which is joined to the engine-side joining surface, an engine component which is provided on an outside of the engine-side joining surface in a radial direction in the flywheel housing and protrudes toward the transmission side, a guide member which is provided on the engine-side joining surface or in the vicinity of the engine-side joining surface of the flywheel housing and in a vicinity of the engine component and which protrudes toward the transmission side further than the engine component, and a guide hole, which is provided on the transmission-side joining surface of the transmission
(Continued)

housing or in the vicinity of the transmission-side joining surface and into which the guide member is inserted.

4 Claims, 2 Drawing Sheets

(51) Int. Cl.
*B60K 25/00* (2006.01)
*H02K 5/00* (2006.01)
*F16H 57/02* (2012.01)
*F02B 67/00* (2006.01)

(52) U.S. Cl.
CPC .... *F02B 67/00* (2013.01); *F16H 2057/02026* (2013.01); *F16H 2057/02043* (2013.01)

(58) Field of Classification Search
CPC ..... F16H 2057/0235; F16H 2057/0222; F16H 2057/0227; F16H 2057/0228
See application file for complete search history.

(56) References Cited

U.S. PATENT DOCUMENTS

| | | | | |
|---|---|---|---|---|
| 5,289,738 | A * | 3/1994 | Szulczewski | B60K 17/105 475/83 |
| 5,404,772 | A * | 4/1995 | Jester | F16H 57/022 74/467 |
| 2002/0153208 | A1 | 10/2002 | Koga | |
| 2010/0151993 | A1 * | 6/2010 | Ike | F16H 57/02 477/138 |
| 2011/0088649 | A1 * | 4/2011 | Minneker, Jr. | F02N 15/00 123/179.25 |
| 2012/0293027 | A1 | 11/2012 | Sakurada et al. | |
| 2015/0027402 | A1 | 1/2015 | Landsiedel et al. | |
| 2017/0217309 | A1 * | 8/2017 | Hashimoto | B60K 5/02 |

FOREIGN PATENT DOCUMENTS

| | | |
|---|---|---|
| GB | 1352516 A | 5/1974 |
| JP | H01-193069 A | 8/1989 |
| JP | 2002-316625 A | 10/2002 |
| JP | 2007-024130 A | 2/2007 |
| JP | 2012-241755 A | 12/2012 |
| JP | 2015-175398 A | 10/2015 |
| WO | 2015080651 A1 | 6/2015 |

OTHER PUBLICATIONS

International Search Report and Written Opinion for related PCT application No. PCT/JP2016/083597, dated Feb. 7, 2017; English translation of ISR provided; 9 pages.

Extended European Search Report for related EP App No. 16864380.7 dated Mar. 6, 2019, 8 pgs.

Office Action for related CN App. No. 201680065887.X dated Jun. 17, 2020. English machine translation provided; 13 pages.

* cited by examiner

TRANSMISSION ASSEMBLY STRUCTURE

CROSS-REFERENCE TO RELATED APPLICATIONS

This application is a U.S. National Stage entry of PCT Application No: PCT/JP2016/083597 filed Nov. 11, 2016, which claims priority to Japanese Patent Application No. 2015-222132, filed Nov. 12, 2015, the contents of which are incorporated herein by reference.

TECHNICAL FIELD

This disclosure relates to a structure for assembling a transmission to an internal combustion engine.

BACKGROUND ART

Generally, a transmission is assembled to an internal combustion engine (engine) by joining a transmission-side joining surface formed on a transmission housing of the transmission to an engine-side joining surface formed on a flywheel housing of the internal combustion engine and fastening the transmission housing to the flywheel housing by a plurality of bolts.

CITATION LIST

Patent Literature

[Patent Literature 1]: Japanese Unexamined Patent Application Publication No. 2002-316625

SUMMARY

Technical Problem

However, there is a case where an engine component which protrudes toward the transmission side with respect to the engine-side joining surface is provided in a place in the vicinity of the engine-side joining surface in the flywheel housing. In this case, before the transmission-side joining surface abuts on the engine-side joining surface at the time of assembling of the transmission, the transmission-side joining surface abuts on the engine component and thus the engine component may be damaged.

This disclosure provides a transmission assembling structure capable of preventing an engine component from being damaged as much as possible at the time of assembling of a transmission.

Solution to Problem

According to an aspect of this disclosure, a transmission assembly structure includes: an engine-side joining surface, which is formed on a flywheel housing of an internal combustion engine; a transmission-side joining surface, which is formed on a transmission housing of a transmission and is joined to the engine-side joining surface; an engine component, which is provided on an outside of the engine-side joining surface in a radial direction in the flywheel housing and which protrudes toward a transmission side with respect to the engine-side joining surface; a guide member, which is provided on the engine-side joining surface or in a vicinity of the engine-side joining surface of the flywheel housing and also in a vicinity of the engine component and which protrudes toward the transmission side further than the engine component with respect to the engine-side joining surface; and a guide hole, which is provided on the transmission-side joining surface or in a vicinity of the transmission-side joining surface of the transmission housing and into which the guide member is inserted.

In the transmission assembly structure, the guide member may be a guide pin.

In the transmission assembly structure, the guide member may be provided on the engine-side joining surface and the guide hole may be provided on the transmission-side joining surface.

In the transmission assembly structure, a concave portion radially inwardly recessed may be formed in an outer peripheral portion of the engine-side joining surface and the engine component may be disposed in the concave portion.

In the transmission assembly structure, the engine component may be a power steering pump.

Advantageous Effects

According to this disclosure, it is possible to prevent an engine component from being damaged at the time of assembling of a transmission as much as possible.

DESCRIPTION OF EMBODIMENTS

Hereinafter, an embodiment of this disclosure will be described with reference to the accompanying drawings.

Figure 1:
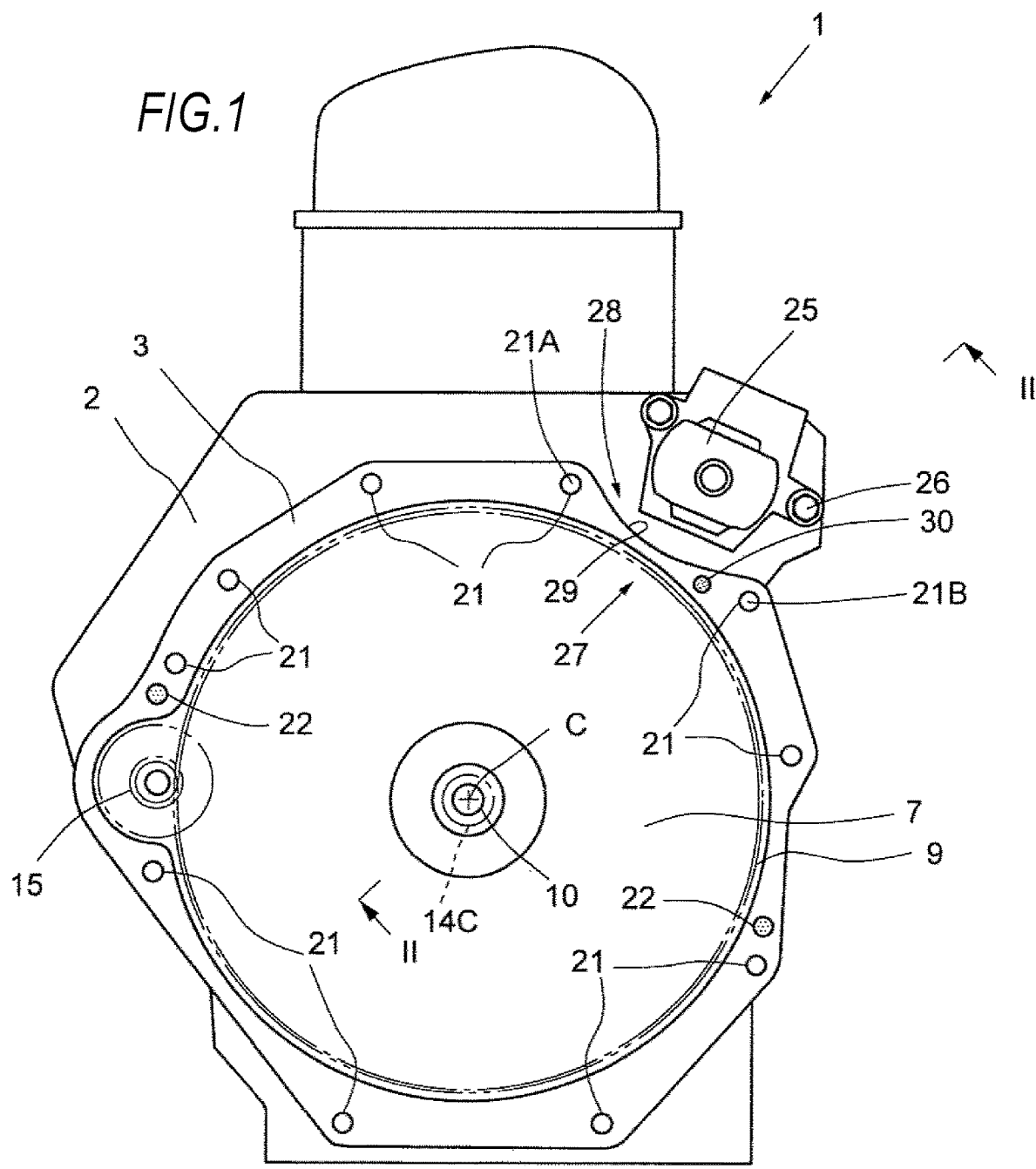
FIG. 1 is a front view illustrating a transmission assembly structure according to an embodiment.
Figure 2:
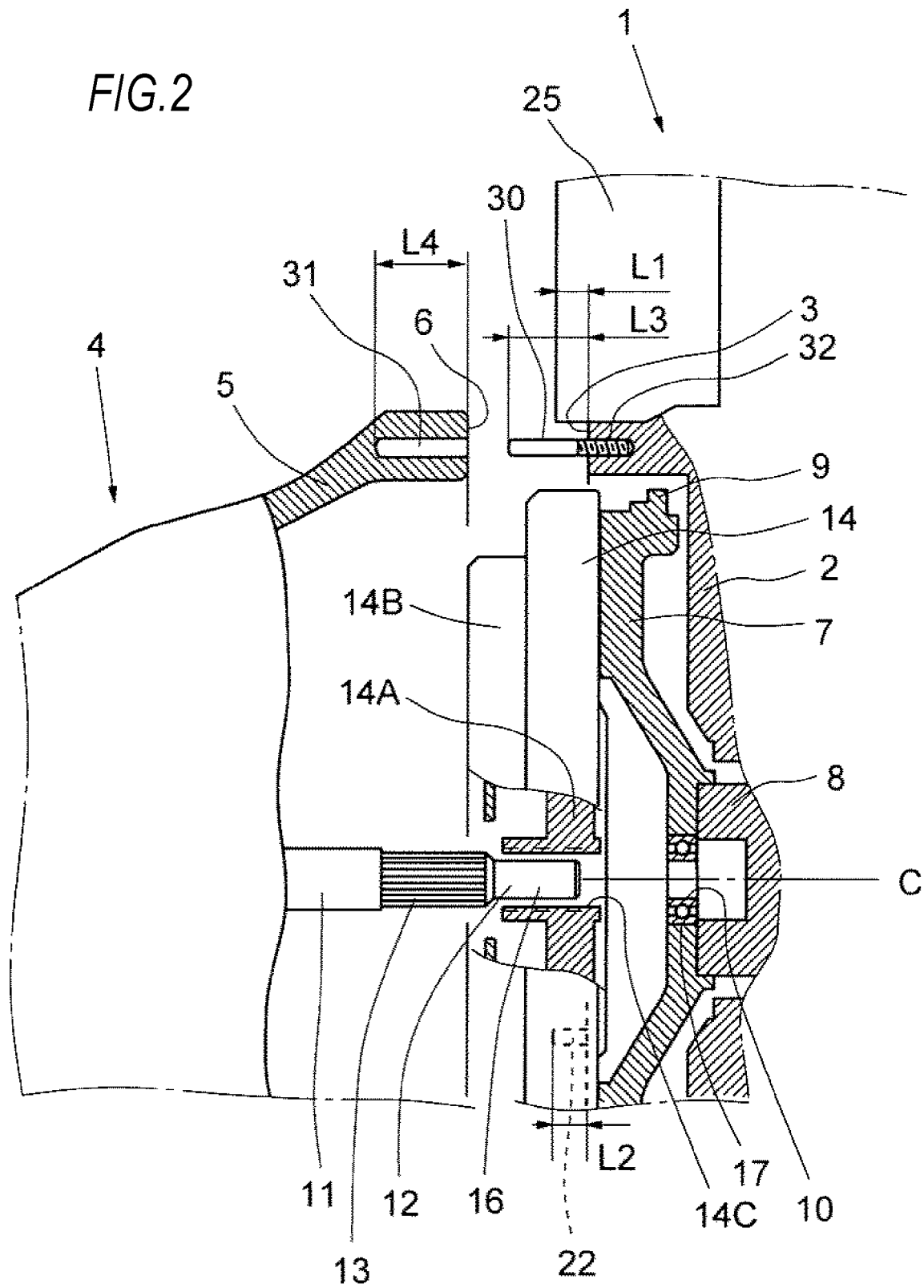
FIG. 2 is a cross-sectional view of FIG. 1 taken along line II-II.

FIG. 1 is a front view illustrating a transmission assembly structure according to an embodiment. FIG. 2 is a cross-sectional view of FIG. 1 taken along line II-II. As shown in the drawings, an engine-side joining surface 3 is formed on a flywheel housing 2 of an internal combustion engine (engine) 1 and a transmission-side joining surface 6 which is joined to the engine-side joining surface 3 is formed on a transmission housing 5 of a transmission 4. The internal combustion engine in the embodiment is a diesel engine to be mounted in a vehicle such as a truck, but the form, kind, and use of the vehicle and the internal combustion engine and the like are not particularly limited. FIG. 1 is a front view when the engine 1 is viewed from the rear side, that is, from the side of the transmission 4.

In the flywheel housing 2, a flywheel 7 is rotatably housed and the flywheel 7 is coaxially attached to a rear end portion of a crank shaft 8 by a plurality of bolts (not shown). A central axis of the crank shaft 8 is illustrated by C. In the outer peripheral portion of the flywheel 7, a flywheel gear 9 with which a starter gear 15 is meshed is provided. In a center portion of the flywheel 7, a bearing 17 formed by a ball bearing is provided in a fixed manner. The bearing 17 has a center hole 10. The bearing 17 and the center hole 10 are arranged coaxially with the crank shaft 8.

A clutch mechanism 14 (not illustrated in FIG. 1) is assembled on a rear surface portion of the flywheel 7. The clutch mechanism 14 is a known dry friction clutch mechanism and includes clutch components such as a clutch disc 14A and a clutch cover 14B. In a center portion of the clutch disc 14A, a spline hole 14C is provided.

In the transmission housing 5, an input shaft 11 of the transmission 4 is rotatably housed. A tip end portion 12 of the input shaft 11 protrudes toward a front side with respect to the transmission-side joining surface 6, that is, to the side of the engine 1. At the tip end portion 12, a tip end shaft portion 16 which is positioned on the forefront side (front side) and is fitted and inserted into the center hole 10, and a spline shaft portion 13 which is positioned adjacent to a rear side of the tip end shaft portion 16 and is fitted and inserted into the spline hole 14C of the clutch disc 14A are formed. The spline shaft portion 13 has a larger diameter than the tip end shaft portion 16.

In the embodiment, the clutch mechanism 14 protrudes rearward from the engine-side joining surface 3 and in an assembling state of the transmission 4, the clutch mechanism 14 is housed in the mission housing 5. The transmission 4 of the embodiment is a manual transmission. However, the kind of the transmission is arbitrary and the transmission may be, for example, an automatic transmission or a continuously variable transmission.

As illustrated in FIG. 1, on the engine-side joining surface 3, a plurality of bolt holes 21 in which female screws are formed are provided. At each position corresponding to these bolt holes 21 on the transmission-side joining surface 6, a plurality of bolt insertion holes (not shown) for inserting fastening bolts (not shown) are provided. The bolt insertion hole is a through-hole. The transmission housing 5 is fastened and fixed to the flywheel housing 2 by inserting the fastening bolts into the bolt insertion holes from the rear side and fastening the bolts to the bolt holes 21.

As illustrated in FIG. 1, a plurality of knock pins 22 are provided to protrude on the engine-side joining surface 3. At each position corresponding to these knock pins 22 on the transmission-side joining surface 6, a plurality of knock pin holes (not shown) for fitting the knock pins 22 are provided. The knock pin hole is a bottomed hole. In a case where the transmission-side joining surface 6 is joined to the engine-side joining surface 3, by fitting the knock pins 22 into the knock pin holes, the transmission housing 5 is positioned in a rotational direction with respect to the flywheel housing 2 before fixation.

In the flywheel housing 2, an auxiliary machine as the engine component, specifically, a power steering pump (hereinafter, referred to as "P/S pump") 25 is provided. The P/S pump 25 is attached to the flywheel housing 2 by a plurality of bolts 26. The P/S pump 25 is connected to the crank shaft 8 through a gear mechanism (not shown) and is driven by the crank shaft 8.

The P/S pump 25 is provided in a place in the vicinity of the engine-side joining surface 3 in the flywheel housing 2 and protrudes toward the rear side with respect to the engine-side joining surface 3, that is, the side of the transmission 4. More specifically, the P/S pump 25 is provided in a place in the vicinity of the outside of an upper right part 27 of the engine-side joining surface 3 in a radial direction in the front view as illustrated in FIG. 1. Here, a concave portion 28 radially inwardly recessed is formed in an outer peripheral portion of the upper right part 27 of the engine-side joining surface 3, and the P/S pump 25 is disposed in the concave portion 28. At left and right positions on the inside of the P/S pump 25 in the radial direction, two bolt holes 21A and 21B which are extremely approximated to the P/S pump 25 are provided. In a region between these bolt holes 21A and 21B in a circumferential direction, the concave portion 28 is formed and the P/S pump 25 is disposed. As illustrated in FIG. 2, the P/S pump 25 protrudes toward the rear side with respect to the engine-side joining surface 3 by a protrusion amount (maximum protrusion amount) L1. The protrusion amount L1 is larger than a protrusion amount L2 of the knock pin 22.

Further, in a place in the vicinity of the P/S pump 25 on the engine-side joining surface 3, as the guide member, a guide pin 30 is provided. Corresponding to this, a guide hole 31 into which the guide pin 30 is inserted is provided on the transmission-side joining surface 6. The guide pin 30 protrudes toward the transmission 4 side further than the P/S pump 25 with respect to the engine-side joining surface 3.

More specifically, the guide pin 30 protrudes from the engine-side joining surface 3 by fastening a male screw portion 32 of a base end portion thereof to the screw hole of the engine-side joining surface 3, like a stud bolt. A protrusion amount L3 of the guide pin 30 with respect to the engine-side joining surface 3 is larger than the protrusion amount L1 of the P/S pump 25. The guide pin 30 is disposed in the region between the bolt holes 21A and 21B where the concave portion 28 is present in the circumferential direction.

The guide hole 31 is a bottomed hole and is disposed at a position corresponding to the guide pin 30 in the radial direction and the circumferential direction. The guide hole 31 has a length L4 which is slightly longer than the protrusion amount L3 of the guide pin 30.

Next, a transmission assembling method in the embodiment will be described.

First, the transmission 4 is hung and supported by a support device (not shown), is positioned almost coaxially with the engine 1 fixed in advance and is positioned at the almost same position as the engine in the rotational direction.

The transmission 4 is gradually brought close to the engine 1 and the transmission-side joining surface 6 is gradually brought close to the engine-side joining surface 3.

At this time, in a case where the guide pin 30 and the guide hole 31 are not in a coaxial relation, first, the tip end (rear end) of the guide pin 30 positioned at the rearmost side on the engine side abuts on the transmission-side joining surface 6. Since the collision of the transmission-side joining surface 6 with the P/S pump 25 can be avoided, it is possible to prevent the P/S pump 25 from being damaged as much as possible.

Then, the position of the transmission 4 is finely adjusted and the tip end of the guide pin 30 is inserted into the guide hole 31. In this state, the transmission 4 is moved to the engine 1 side and the guide pin 30 is deeply inserted into the guide hole 31.

Thus, the transmission 4 is brought close to the engine 1 while being guided by the guide pin 30. The movement direction of the transmission 4 is restricted by the guide pin 30, and the transmission 4 is movable to the engine 1 only in axial and circumferential directions of the guide pin 30. In the same manner, the transmission-side joining surface 6 is also movable not to the crank shaft 8 but in the circumferential direction of the guide pin 30.

While the transmission 4 (transmission-side joining surface 6) is brought close to the engine 1 (engine-side joining surface 3) in the axial direction in a state in which the transmission is guided by the guide pin 30, the rotation position of the transmission 4 around the guide pin 30 is finely adjusted, and the spline shaft portion 13 and the tip end shaft portion 16 of the transmission 4 side are respectively inserted into the spline hole 14C and the center hole 10 of the engine 1 side to fit the knock pins 22 of the engine 1 side to the knock holes of the transmission 4 side.

At this time, the rotational movement amount of the transmission 4, which requires fine adjustment, around the guide pin 30 is extremely small and a distance between an inner peripheral surface portion 29 of the concave portion 28 that may collide with the P/S pump 25 and the guide pin 30 is reduced. Thus, the rotational movement amount of the inner peripheral surface portion 29 of the concave portion 28 at the time of fine adjustment is small. Therefore, it is possible to reliably avoid the inner peripheral surface portion 29 of the concave portion 28 from colliding with the P/S pump 25.

When the tip end shaft portion 16 is inserted into the center hole 10 and the knock pins 22 are fitted to the knock pin holes, the position of the transmission 4 around the axis of the crank shaft with respect to the engine 1 is determined. Then, by simply brining the transmission 4 close to the engine 1, the transmission-side joining surface 6 is joined, that is, in surface-contact with the engine-side joining surface 3. Thus, the position of the transmission 4 in the axial direction of the crank shaft with respect to the engine 1 is determined.

Finally, the fastening bolts are inserted into the bolt insertion holes of the transmission 4 side from the rear side and fastened to the bolt holes 21 of the engine 1. By repeating this operation, the transmission housing 5 is fastened and fixed to the flywheel housing 2.

According to the embodiment, since the guide pin 30 which protrudes toward the transmission 4 side further than the P/S pump 25 is provided in the place in the vicinity of the P/S pump 25, at the time of assembling of the transmission 4, the collision of the transmission housing 5 and the transmission-side joining surface 6 with the P/S pump 25 are reliably avoided, and thus damage of the P/S pump 25 can be prevented as much as possible. At the same time, damage of the transmission housing 5 and the transmission-side joining surface 6 due to collision with the P/S pump 25 can be prevented as much as possible. Further, in a case where the position of the transmission 4 around the guide pin 30 is finely adjusted after the guide pin 30 is inserted into the guide hole 31, the transmission housing 5 (particularly, the inner peripheral surface portion 29 of the concave portion 28) can be reliably avoided from colliding with the P/S pump 25.

In the embodiment, since the guide pin 30 is provided on the engine-side joining surface 3 and the guide hole 31 is provided on the transmission-side joining surface 6, the transmission-side joining surface 6 can be directly guided to the engine-side joining surface 3 by being guided by the guide pin 30 and workability can be improved.

In the embodiment, after the guide pin 30 is inserted into the guide hole 31, the tip end shaft portion 16 is inserted into the center hole 10. However, the operation order may be reversed. That is, in the embodiment, when the position of the rear end of the guide pin 30 coincides with the position of the front end of the guide hole 31, the tip end shaft portion 16 is not yet inserted into the center hole 10. However, the tip end shaft portion may be inserted into the center hole. In this case, after the tip end shaft portion 16 is inserted into the center hole 10, the guide pin 30 is inserted into the guide hole 31 and the position of the transmission 4 around the axis of the crank shaft is finely adjusted. However, at this time, since the transmission-side joining surface does not abut on the P/S pump 25 only by sliding the transmission-side joining surface 6 on the rear end of the guide pin 30, it is possible to prevent the P/S pump 25 from being damaged as much as possible.

The embodiment of this disclosure has been described in detail. However, this disclosure can be applied to other embodiments as shown below.

(1) For example, instead of the above-described guide pin 30, a guide member may be constituted of a stud bolt that can be used for fastening the transmission housing. In this case, after the guide hole is formed as a through-hole which passes through the transmission housing 5 and the stud bolt is inserted into the through-hole, a fastening nut is fastened to the stud bolt. In the same manner, the above-described bolt hole 21 may be replaced with the stud bolt.

(2) As long as the place is a place in the vicinity of the engine component, the guide member may be provided in a place in the vicinity of the engine-side joining surface. Correspondingly, the guide hole may also be provided in a place in the vicinity of the transmission-side joining surface.

(3) The engine component is not limited to the P/S pump 25 and may be an arbitrary component. For example, the engine component may be another auxiliary machine driven by the crank shaft.

The embodiment of this disclosure is not limited to the above-described embodiments and all modifications and applications, or equivalents thereof encompassed within the idea of this disclosure defined by the appended claims are also included in this disclosure. Accordingly, this disclosure should not be interpreted in a limited manner, but can also be applied to other arbitrary technologies that belong to the range of the idea of the invention.

The present application is based on the Japanese patent application (JP2015-222132) filed on Nov. 12, 2015, the contents of which are incorporated herein by reference.

INDUSTRIAL APPLICABILITY

According to the transmission assembly structure of this disclosure, it is possible to prevent an engine component from being damaged as much as possible at the time of assembling of a transmission.

REFERENCE SIGNS LIST

1: internal combustion engine
2: flywheel housing
3: engine-side joining surface
4: transmission
5: transmission housing
6: transmission-side joining surface
25: power steering pump
28: concave portion
30: guide pin
31: guide hole

The invention claimed is:

1. A transmission assembly structure comprising:
an engine-side joining surface, which is formed on a flywheel housing of an internal combustion engine;
a transmission-side joining surface, which is formed on a transmission housing of a transmission and is joined to the engine-side joining surface;
a power steering pump, which is provided on a position farther away from a rotation axis of a flywheel than the engine-side joining surface in a radial direction and which protrudes toward a transmission side with respect to the engine-side joining surface;
a concave portion formed in an outer peripheral portion of the engine-side joining surface and recessed inward in a radial direction perpendicular to the rotation axis of the flywheel, the power steering pump disposed in the concave portion;

two bolt holes, which are provided on the engine-side joining surface closer to the rotation axis of a flywheel than the power steering pump and immediately approximated to the power steering pump;

a guide member, which is provided on the engine-side joining surface or in a vicinity of the engine-side joining surface of the flywheel housing and also in a vicinity of the power steering pump between the two bolt holes and which protrudes toward the transmission side further than the power steering pump with respect to the engine-side joining surface; and a guide hole, which is provided on the transmission-side joining surface or in a vicinity of the transmission-side joining surface of the transmission housing and into which the guide member is inserted.

2. The transmission assembly structure according to claim 1, wherein the guide member is a guide pin.

3. The transmission assembly structure according to claim 1, wherein the guide member is provided on the engine-side joining surface, and the guide hole is provided on the transmission side joining surface.

4. The transmission assembly structure according to claim 1, wherein the flywheel housing and the transmission housing form accommodation space to accommodate the flywheel, and wherein the power steering pump is provided outside of the accommodation space.

* * * * *